(12) United States Patent
Ben-Itzhak et al.

(10) Patent No.: US 9,110,595 B2
(45) Date of Patent: Aug. 18, 2015

(54) SYSTEMS AND METHODS FOR ENHANCING PERFORMANCE OF SOFTWARE APPLICATIONS

(75) Inventors: Yuval Ben-Itzhak, Brno (CZ); Ing. Z. Breitenbacher, Brno (CZ); Jiří Bracek, Kyjov (CZ); Jaroslav Nix, Tišnov (CZ); Martin Vejnár, Brno (CZ); Tomáš Benna, Kravaře (CZ); Marián Jurík, Bánov (SK); Václav Pich, Brno (CZ)

(73) Assignee: AVG Netherlands B.V., Amsterdam (NL)

( * ) Notice: Subject to any disclaimer, the term of this patent is extended or adjusted under 35 U.S.C. 154(b) by 292 days.

(21) Appl. No.: 13/407,412

(22) Filed: Feb. 28, 2012

(65) Prior Publication Data

US 2013/0227544 A1   Aug. 29, 2013

(51) Int. Cl.
*G06F 9/445* (2006.01)
*G06F 3/06* (2006.01)

(52) U.S. Cl.
CPC ............ *G06F 3/0611* (2013.01); *G06F 3/0643* (2013.01); *G06F 3/0674* (2013.01); *G06F 3/0659* (2013.01)

(58) Field of Classification Search
USPC ........................................................ 717/174
See application file for complete search history.

(56) References Cited

U.S. PATENT DOCUMENTS

| | | | |
|---|---|---|---|
| 5,345,575 A | 9/1994 | English et al. | |
| 6,073,232 A | 6/2000 | Kroeker et al. | |
| 6,081,799 A | 6/2000 | Beavin et al. | |
| 6,206,289 B1 | 3/2001 | Sharpe et al. | |
| 6,226,422 B1 | 5/2001 | Oliver | |
| 6,256,728 B1 | 7/2001 | Witt et al. | |
| 6,442,682 B1 | 8/2002 | Pothapragada et al. | |
| 6,574,713 B1 | 6/2003 | Kosche et al. | |
| 6,601,167 B1 | 7/2003 | Gibson et al. | |
| 6,606,617 B1 | 8/2003 | Bonner et al. | |

(Continued)

FOREIGN PATENT DOCUMENTS

| | | |
|---|---|---|
| AU | 2002346639 | 6/2003 |
| CA | 2680601 | 12/2009 |

(Continued)

OTHER PUBLICATIONS

"On the Care and Feeding of the Spinning Disks" [online] by Alex Russell. Retrieved from the internet on Feb. 27, 2012: http://infrequently.org/2011/01/on-the-care-and-feeding-of-spinning-disks, 6 pp.

(Continued)

*Primary Examiner* — Hang Pan
(74) *Attorney, Agent, or Firm* — Kramer Levin Naftalis & Frankel LLP

(57) ABSTRACT

A system for enhancing performance of a software application obtains a list of files to be processed by the software application, and sorts that list in the order of the physical position of files in the list on a hard drive. The files are loaded in the sorted order which can decrease or minimize the total file seeking time, thereby increasing the speed of execution of the software.

24 Claims, 5 Drawing Sheets

(56) References Cited

U.S. PATENT DOCUMENTS

| | | |
|---|---|---|
| 6,633,968 B2 | 10/2003 | Zwiegincew et al. |
| 6,671,774 B1 | 12/2003 | Lam et al. |
| 6,748,534 B1 | 6/2004 | Gryaznov et al. |
| 6,751,780 B1 | 6/2004 | Neff et al. |
| 6,981,099 B2 | 12/2005 | Paulraj et al. |
| 7,000,077 B2 | 2/2006 | Grimsrud et al. |
| 7,065,790 B1 | 6/2006 | Gryaznov |
| 7,139,909 B2 | 11/2006 | Lee |
| 7,359,890 B1 | 4/2008 | Ku et al. |
| 7,380,725 B2 | 6/2008 | McGill |
| 7,383,417 B2 | 6/2008 | Yasue et al. |
| 7,434,261 B2 | 10/2008 | Costea et al. |
| 7,437,504 B2 | 10/2008 | Waldvogel |
| 7,506,374 B2 | 3/2009 | Carmona |
| 7,568,233 B1 | 7/2009 | Szor et al. |
| 7,581,253 B2 | 8/2009 | Challener et al. |
| 7,647,297 B2 | 1/2010 | LaChapelle et al. |
| 7,669,044 B2 | 2/2010 | Fitzgerald et al. |
| 7,743,060 B2 | 6/2010 | Fontoura et al. |
| 7,760,654 B2 | 7/2010 | Adya et al. |
| 7,778,983 B2 | 8/2010 | Jorden et al. |
| 7,788,650 B2 | 8/2010 | Johnson et al. |
| 7,836,504 B2 | 11/2010 | Ray et al. |
| 7,845,008 B2 | 11/2010 | Waltermann et al. |
| 7,861,296 B2 | 12/2010 | Costea et al. |
| 7,937,263 B2 | 5/2011 | Carrier et al. |
| 7,949,665 B1 * | 5/2011 | Millard et al. ................. 707/752 |
| 7,975,025 B1 | 7/2011 | Szabo et al. |
| 7,984,503 B2 | 7/2011 | Edwards |
| 1,020,922 A1 | 8/2011 | Tikkanen et al. |
| 1,021,920 A1 | 9/2011 | Asaad et al. |
| 1,022,512 A1 | 9/2011 | Jarrett et al. |
| 8,087,081 B1 | 12/2011 | Chun et al. |
| 8,087,084 B1 | 12/2011 | Andruss et al. |
| 8,091,134 B2 | 1/2012 | Benton et al. |
| 2002/0067515 A1 | 6/2002 | Abe |
| 2003/0115479 A1 | 6/2003 | Edwards et al. |
| 2003/0120952 A1 | 6/2003 | Tarbotton et al. |
| 2004/0158730 A1 | 8/2004 | Sarkar |
| 2004/0230748 A1 | 11/2004 | Ohba |
| 2005/0195435 A1 | 9/2005 | Kojima et al. |
| 2005/0216759 A1 | 9/2005 | Rothman et al. |
| 2005/0219657 A1 | 10/2005 | Sasaki et al. |
| 2006/0101264 A1 | 5/2006 | Costea et al. |
| 2006/0161546 A1 | 7/2006 | Callaghan et al. |
| 2006/0294356 A1 | 12/2006 | Kumar et al. |
| 2007/0055711 A1 | 3/2007 | Polyakov et al. |
| 2007/0078915 A1 | 4/2007 | Gassoway |
| 2007/0156677 A1 | 7/2007 | Szabo |
| 2007/0294767 A1 | 12/2007 | Piccard et al. |
| 2008/0005797 A1 | 1/2008 | Field et al. |
| 2008/0086290 A1 | 4/2008 | Wilson |
| 2008/0155339 A1 | 6/2008 | Lowe et al. |
| 2008/0195676 A1 | 8/2008 | Lyon et al. |
| 2008/0209198 A1 | 8/2008 | Majni et al. |
| 2008/0229016 A1 | 9/2008 | Waites |
| 2009/0049550 A1 | 2/2009 | Shevchenko |
| 2009/0198738 A1 | 8/2009 | Berger et al. |
| 2009/0199190 A1 | 8/2009 | Chen et al. |
| 2009/0222923 A1 | 9/2009 | Dixon |
| 2009/0235134 A1 | 9/2009 | Guo et al. |
| 2009/0249055 A1 | 10/2009 | Itoh |
| 2009/0287842 A1 | 11/2009 | Plamondon |
| 2010/0011029 A1 | 1/2010 | Niemela |
| 2010/0017591 A1 * | 1/2010 | Smith et al. ................. 713/2 |
| 2010/0023679 A1 * | 1/2010 | Blum ................. 711/103 |
| 2010/0031361 A1 | 2/2010 | Shukla |
| 2010/0083381 A1 | 4/2010 | Khosravi et al. |
| 2010/0149593 A1 | 6/2010 | Dowling et al. |
| 2010/0162400 A1 | 6/2010 | Feeney et al. |
| 2010/0169972 A1 * | 7/2010 | Kuo et al. ................. 726/23 |
| 2010/0241654 A1 | 9/2010 | Wu et al. |
| 2010/0269032 A1 | 10/2010 | King et al. |
| 2011/0271347 A1 | 11/2011 | Zimmer et al. |
| 2011/0296525 A1 | 12/2011 | Turbin |

FOREIGN PATENT DOCUMENTS

| | | |
|---|---|---|
| EP | 0201848 | 11/1986 |
| EP | 1229433 A1 | 8/2002 |
| EP | 1835409 | 9/2007 |
| EP | 2194471 | 6/2010 |
| EP | 2251781 | 11/2010 |
| JP | 2007317190 | 12/2007 |
| JP | 2008191824 | 8/2008 |
| JP | 2008305225 | 12/2008 |
| JP | 2009020765 | 1/2009 |
| JP | 2010074604 | 4/2010 |
| JP | 2010237837 | 10/2010 |
| WO | 99/15953 D2 | 4/1999 |
| WO | WO-2004055667 | 7/2004 |
| WO | WO-2008112770 | 9/2008 |
| WO | WO-2009042986 | 4/2009 |
| WO | WO-2010142594 | 12/2010 |
| WO | WO-2011153239 | 12/2011 |

OTHER PUBLICATIONS

"Prefetcher—Wikipedia, the free encyclopedia" [online]. Retrieved from the internet on Feb. 27, 2012: http://en.wikipedia.org/wiki/Prefetcher, 3 pp.

International Search Report, Application No. PCT/IB2013/000696, date of mailing Sep. 2, 2014.

* cited by examiner

SYSTEMS AND METHODS FOR ENHANCING PERFORMANCE OF SOFTWARE APPLICATIONS

FIELD OF THE INVENTION

The invention relates generally to the field of improving performance of software products, and, more specifically, to systems and methods for efficiently loading files required by a software product.

BACKGROUND

Some software products such as anti-virus scanners, picture/video viewers, etc., process a large number of files. For example, a typical anti-virus scanner may scan all files in one or more selected folders on a hard drive of a computer or even all of the files on the hard drive. These hundreds or even thousands of files are usually loaded in the computer memory (e.g., RAM) prior to being processed.

In a typical scenario, a module of the software product requests the operating system of the computer to provide a list of files to be loaded and processed that are within a specified scope (e.g., a folder, a list of folders, a disk, etc.). The operating system returns a list of file identifiers based on the order the files are listed in a file-system database maintained by the operating system. Then, the software module, with assistance from the operating system, loads the files associated with the file identifiers in the list from permanent storage (e.g., a hard drive). The software processes a file as it is loaded, or may processes a set of files after the files in the set are loaded.

The overall performance of the software product generally depends not only on the speed of processing the loaded files, but also on the speed of loading the files. In particular, when a large number of files are to be loaded, such as by an anti-virus software, slowly loading several files can significantly affect the overall software performance. Various known techniques, however, only improve the speed of processing of the files—not the speed with which they are loaded prior to processing. According to one method, the loading and processing of files are interleaved such that the processor may analyze a previously loaded file while waiting for one or more other files to be loaded. This can increase the processor utilization, improving the overall performance of the software. These systems, however, do not improve the speed of loading of the several files, which, as described above, also adversely affects software performance. Therefore, there is a need for methods and systems for addressing file loading times, thus improving the overall performance of software products requiring processing of a large number of files.

SUMMARY OF THE INVENTION

In various embodiments of the present invention, the overall performance of a software product is improved by improving the speed of loading several files to be processed. This is achieved, in part, by obtaining additional information about the files from a list of file identifiers provided by the operating system. The additional information may include a file size, the physical position of the file on the disk, etc. Instead of accessing and loading the files in the order listed by the operating system, the files are loaded in an order based on the additional information, such as their physical position on the disk. Doing so generally causes the disk head to move in only one direction during file access. Moreover, successive movements of the disk head while accessing successive files may be shortened. This can significantly decrease the time taken to move the disk head to access each file, thereby significantly improving the speed of loading several files. This, in turn, can improve the overall software performance.

Accordingly, in one aspect, various embodiments feature a computer-implemented method for loading the files required by a software program in computer memory. The method includes obtaining a first list of file identifiers, each being associated with a respective file, and sorting the first list based on a first attribute of each of the associated files. The method also includes selecting, in sorted order, a file identifier in the sorted first list and loading the file associated with the selected file identifier. The selecting and loading steps are repeated until each file identifier in the sorted first list is selected, and the associated file is loaded.

The application program may include one or more of a virus scanner, a spyware scanner, an ad-ware scanner, a malware scanner, a backup program, a multicopy program, a compiler, and a data-mining program. In some embodiments, the file identifier includes a file entry in a directory record, and the first attribute may include location of files associated with the file identifiers. The location may be a cluster location.

In some embodiments, obtaining the first list of file identifiers includes receiving a second list of the file identifies. For each file identifier in the second list (i) a second attribute of a file associated with the file identifier is compared with a pre-determined threshold, and (ii) based on the comparison, the file identifier is selectively added to the first list. The second attribute may include file size and the threshold may be, for example, one Kbyte.

In some embodiments, the loaded files are analyzed and the analyzing step may include scanning the loaded file for at least one of virus, spyware, adware, and malware. The analyzing step may also include copying the file to another memory location, through a network or directly, compiling the file, and/or extracting information from the file.

In some embodiments, the software program is a boot program, and obtaining the first list of file identifies includes recording, during a prior execution of the boot program, each file loaded in the computer memory. Obtaining the first list further includes storing a file identifier corresponding to the loaded file in the first list of file identifiers, storing the first list on a non-volatile memory (e.g., a hard disk, flash memory, etc.), and accessing the stored first list during a subsequent execution of the boot program. The loading step may include storing the files in a cache memory, and the method may further include accessing the files from the cache memory, and analyzing the accessed files.

In another aspect, various embodiments feature another computer-implemented method for loading, in computer memory, files required by a software program. The method includes receiving a first list of file identifies, each being associated with a respective file. For each file identifier in the first list (i) a first attribute of the associated file is compared with a pre-determined threshold, and (ii) based on the comparison, that file identifier is selectively added to a second list. The method also includes sorting the second list based on a second attribute of the files associated with the file identifiers in the second list, selecting, in sorted order, a file identifier in the sorted second list, and loading the file associated with the selected file identifier. The selecting and loading steps are repeated until each file identifier in the sorted second list is selected.

In another aspect, various embodiments feature a system for enhancing performance of a software program. The system includes a sorter module for (i) obtaining a first list of file identifiers, each being associated with a respective file, and (ii) sorting the first list based on a first attribute of each of the associated files. The system also includes a loader module for selecting, in sorted order, each file identifier in the sorted first list, and loading the file associated with the selected file identifier. The application program may include one or more of a virus scanner, a spyware scanner, an ad-ware scanner, a malware scanner, a backup program, a multicopy program, a compiler, and a data-mining program.

In some embodiments, the file identifier includes a file entry in a directory record, and the first attribute may include location of files associated with the file identifiers. The location may include a cluster location. The sorter module may be configured to receive a second list of the file identifies, and for each file identifier in the second list (i) to compare a second attribute of a file associated with the file identifier with a pre-determined threshold, and (ii) based on the comparison, to add selectively the file identifier to the first list. The second attribute may include file size and the threshold may be, e.g., one Kbyte.

In some embodiments, the system further comprises an analyzer for analyzing the loaded file. The analyzer may be configured to scan the loaded file for at least one of virus, spyware, adware, and malware. The analyzer may also be configured to copy the file to another memory location, through a network or directly, compile the file, and/or to extract information from the file.

In some embodiments, the software program is a boot program, and the sorter module is configured to record, during a prior execution of the boot program, each file loaded in the computer memory. The sorter module is also configured to store a file identifier corresponding to the loaded file in the first list of file identifiers, to store the first list on a non-volatile memory (e.g., hard-disk, flash memory, etc.), and to access the stored first list during a subsequent boot operation. In some embodiments, the system comprises an analyzer module, and the loader module is configured to store the files in a cache memory. The analyzer module is configured to access the files from the cache memory, and to analyze the accessed files.

In another aspect, various embodiments feature another system for enhancing performance of a software program. The system includes a sorter module to receive a first list of file identifies, each being associated with a respective file. For each file identifier in the first list, the sorter module: (a) compares a first attribute of the associated file with a pre-determined threshold, and (b) based on the comparison, selectively adds that file identifier to a second list. Moreover, the sorter module sorts the second list based on a second attribute of the files associated with the file identifiers in the second list. The system includes a loader module for selecting, in sorted order, each file identifier in the sorted second list, and for loading the file associated with the selected file identifier.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

A computer hard drive typically includes mechanical parts such as several rotating magnetic disks and one or more read/write heads that access the disks. Data representing the various files used by the computer are stored in cylindrical tracks on one of the magnetic disks. Before the file data can be accessed, i.e., read and/or written, the disk head is moved to a location over the track where that file (or portion of the file) is located. The disk-head movement takes some time, typically on the order of 3-12 ms on an average per file access, depending on the size and quality of the disk drive. In fact, the seek time, i.e., the time required to position the disk head at a required location, is often a significant bottleneck of accessing and loading files.

Figure 1:
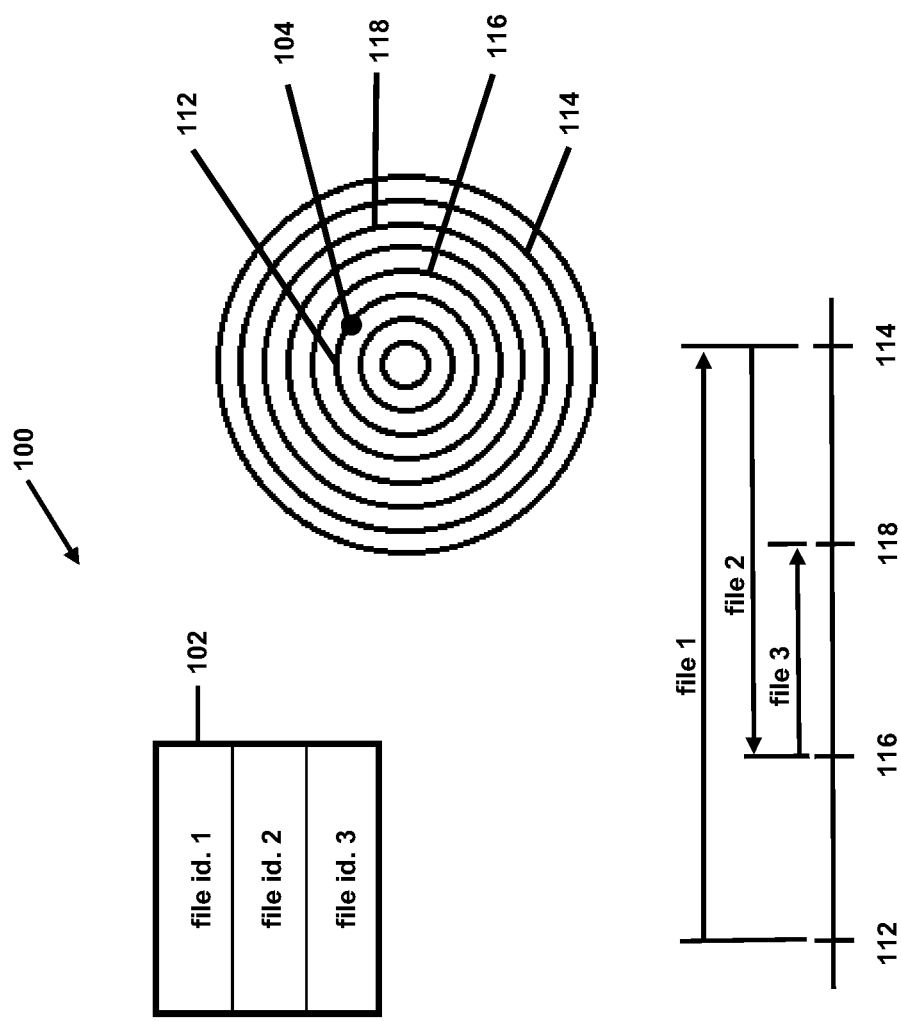
FIG. 1 schematically illustrates a conventional system for loading several files.

In general, there is no correlation between the physical position of a file on the hard disk and the position of its record (i.e., the entry of the file identifier) in the file system database. As a result, in a conventional system in which numerous files are accessed in the order of their record in the file-system database, the disk head typically moves back and forth in a far from optimal manner. For example, FIG. 1 depicts a list 102 of file identifiers associated with the files to be accessed. In order to access file 1, the disk head 104 is moved forward from its current location on track 112 to track 114. Then, to access file 2, the disk head 104 is moved backward to track 116. Finally, the disk head is moved to track 118, to access file 3. While accessing a large number of files, such back and forth movements can add a significant delay to the file loading process.

Figure 2:
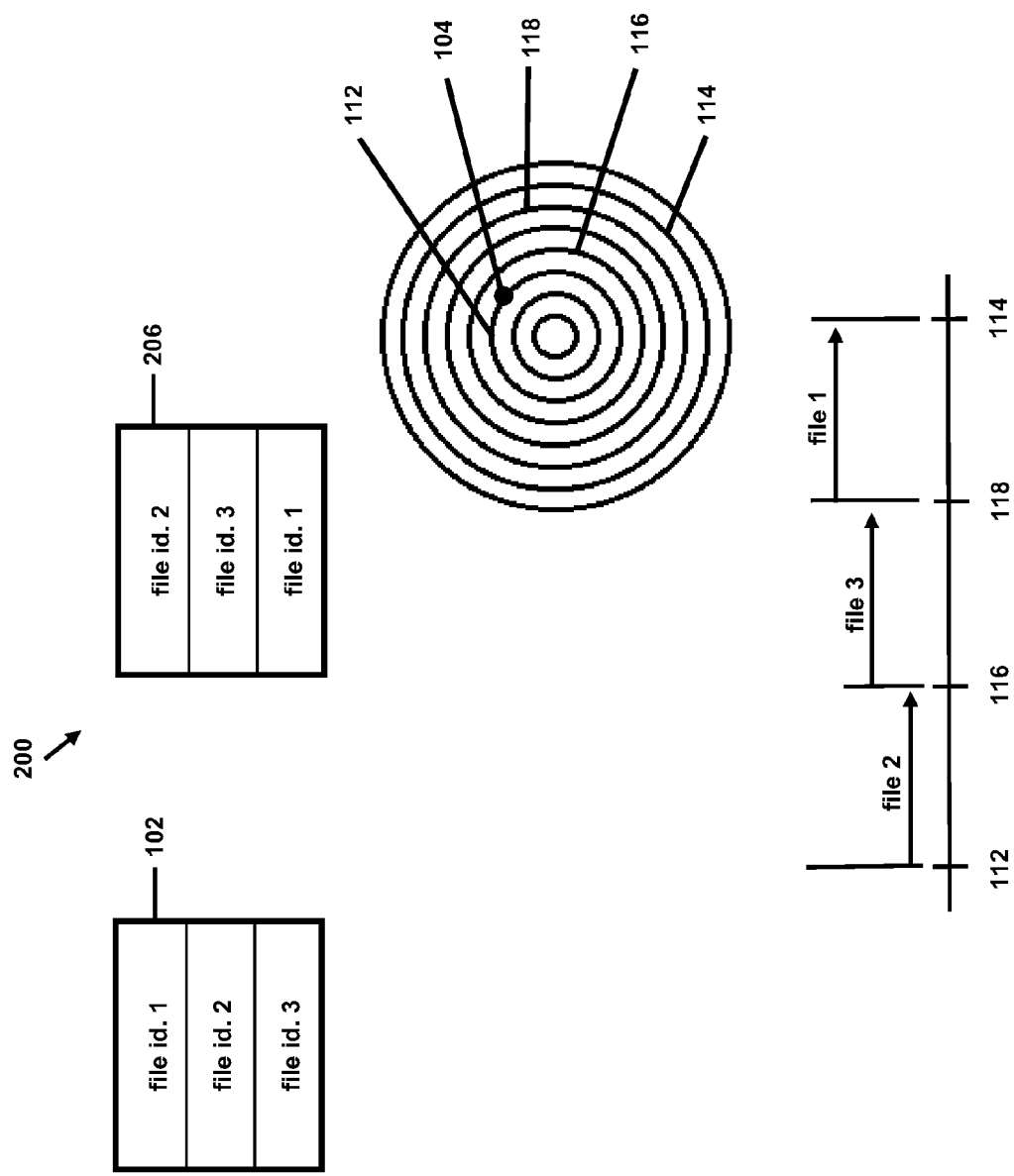
FIG. 2 schematically illustrates a system for efficiently loading several files according to one embodiment.

With reference to FIG. 2, in an exemplary system 200 according to one embodiment, the file identifiers in the list 102 are sorted according to the physical positions of the associated files on the disk, resulting in a sorted list 206. The information about the physical positions of the files is typically provided by the operating system from a file-system database. From the sorted list 206, file 2 is accessed first, so that the disk head 104 moves from its current location on track 112 to track 116. Subsequently, to access file 3, the disk head 104 is moved to track 118, and then to track 114, to access file 1. Thus, the disk head 104 is moved only in the forward direction. Moreover, during a series of consecutive file accesses, the total distance by which the disk head 104 is moved is minimized because the files are accessed in the order of their physical position. Therefore, the system 200 minimizes the total seek time, which can minimize the time required to load several files to be processed.

Figure 3:
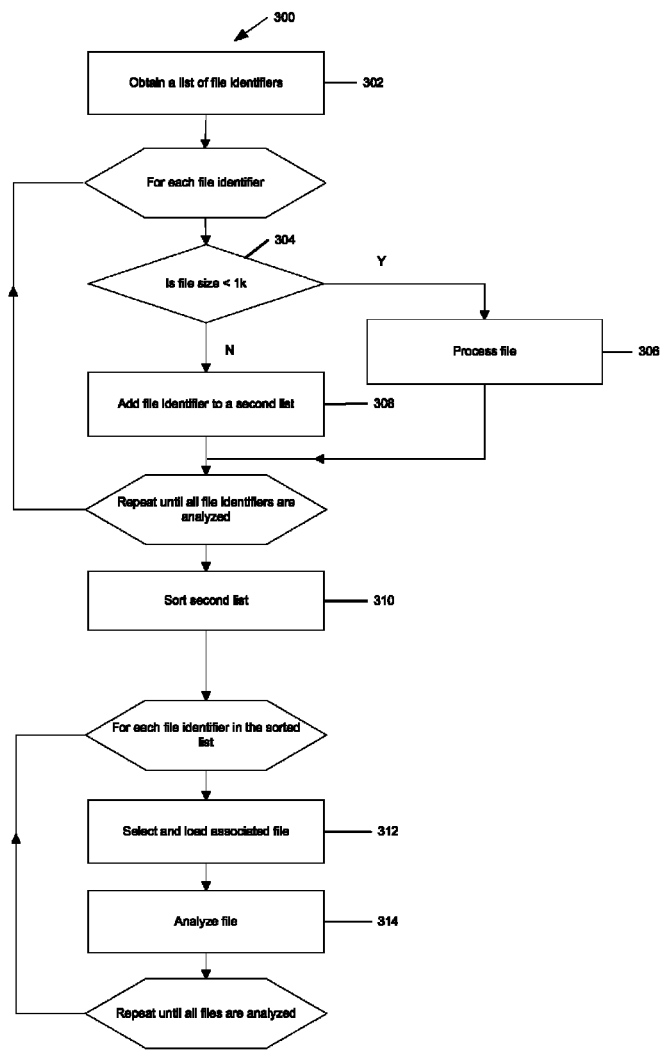
FIG. 3 illustrates a process for loading several files according to one embodiment.

With reference to FIG. 3, in step 302 the file-system database entries of one or more specified folders are browsed using "FindFirstFile"/"FindNextFile" functions commonly provided by the operating system. These functions enable iterating over the files located in permanent storage, by providing a list of file identifiers that are also stored in the file-system database. One file is associated with each file identifier, and as such, this first list includes the file identifiers associated with all of the files to be processed by the software.

For each file identifier in the list, in step 304 the size of the associated file is compared with a certain threshold (e.g., 1 Kbyte). A file smaller in size than the threshold may not be stored on the hard drive, and instead, may be stored in the directory record (e.g. a Master File Table (MFT) record) in the file-system database maintained by the operating system. Therefore, such a file is processed immediately in step 306, because the time to seek that file is not related to disk-head movement. In other alternative implementations, the files that are below this size threshold may be retrieved subsequent to retrieving the larger files from the disk.

Any file that is larger than the threshold is stored somewhere on the hard drive. In step 308, the file identifier associated such a file is stored in a second list. Various other file parameters, such as the volume handle, the unique file id, and the file start position (cluster) are also stored and associated with the file identifier in the second list. The steps 302, 304, and the step 306 or 308 are repeated until all of the file identifiers in the first list have been analyzed.

In step 310, the second list of file identifiers is sorted based on the starting cluster of the associated files. The starting cluster represents the physical position of a file on the hard drive. In step 312, a file identifier is selected from the sorted second list in order, i.e., in the order of the physical position of the associated file, and is loaded in computer memory using standard functions provided by the operating system. The full path of the file to determine its location may be obtained using information stored in the second list.

The loaded file is analyzed in step 314. The specific analysis performed depends on the overall functionality of the software product. For example, a virus/malware scanner may scan the loaded file for virus, adware, malware, spyware etc. Similarly, a photo-viewer may display an image in the file in a photo album. A file transfer, backup, and/or multicopy program may copy the file to a new location on the disk drive or to another computer over a network. Compilers and data-mining software products may also access a large number of files. The steps 312, 314 are repeated for all of the file identifiers in the sorted second list. In some embodiments, all or a subset of files are loaded in the memory and then the loaded files are analyzed. As described above with reference to FIG. 2, because the files are loaded in the order of their physical position on the hard drive according to process 300, unnecessary disk-head movements are avoided or mitigated, which can substantially decrease the time required to load several files to be processed by the software product.

Figure 4:
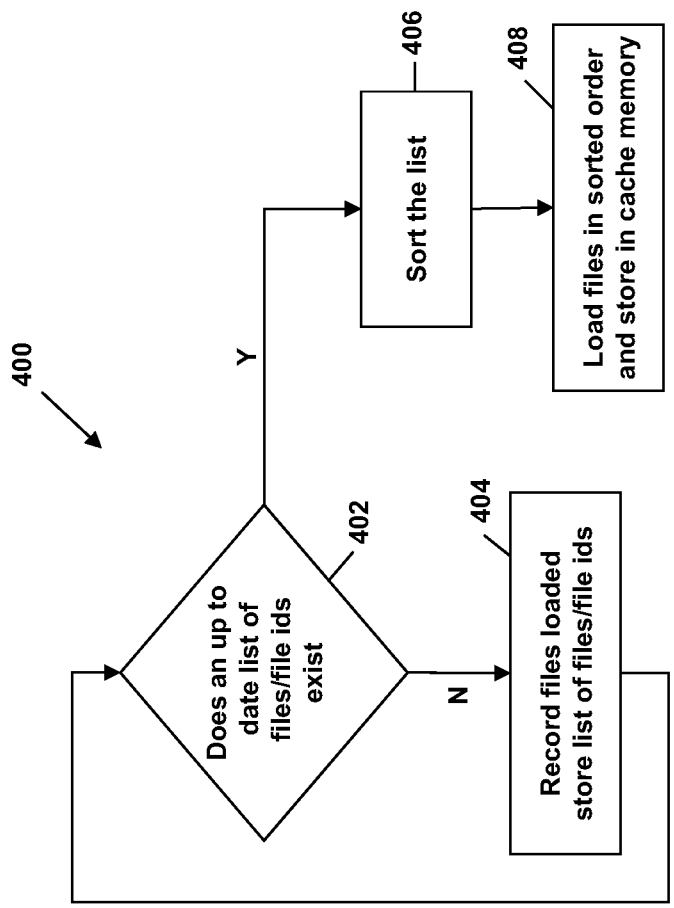
FIG. 4 illustrates another process for loading several files according to another embodiment.

In an exemplary process 400 described with reference to FIG. 4, the files to be processed by the software are not specified in terms of one or more folders or a disk. As the software begins to execute, in step 402, a check is performed to determine if a list of files required by the software exists, and if the list is up to date. If the list does not exist or is not up to date, each file loaded during the initialization and/or execution of the software is recorded in step 404. The list is stored for subsequent use before the software application terminates.

During a subsequent execution of the software, the list of required files may be found in step 402. In step 406, that list is sorted in the order of the physical positions of the files. The information about the physical position of a file may be obtained from the operating system using a unique file identifier associated with the file. Then in step 408, the files in the sorted list are loaded in order and may be stored in cache memory. The execution of the software (e.g., the boot component of the operating system) is suspended during the steps 406 and 408 while the required files are loaded. When execution of the software continues, the required files are accessed from the cache memory. Once again, the process 400 enhances software performance by decreasing or minimizing the total time required to load all of the files needed by the software, because the files are loaded in the order of their physical position on the hard drive, thereby avoiding unnecessary disk-head movements.

Figure 5:
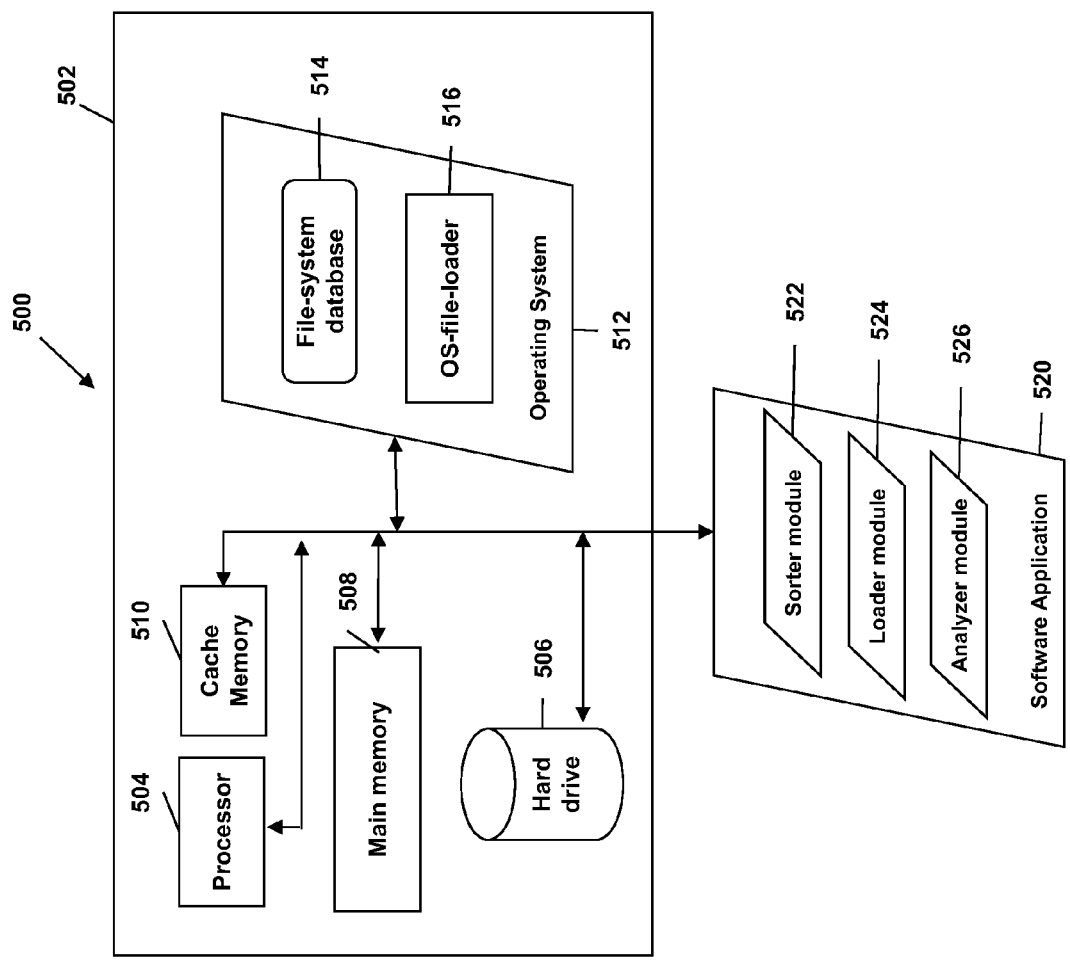
FIG. 5 schematically depicts a system for efficiently loading files according to one embodiment.

Referring to FIG. 5, a hardware/software system 500 includes a computer 502 having a processor 504, a hard drive 506, main memory 508, and cache memory 510. The computer 502 also includes an operating system (OS) 512 that includes a file-system database 514 and an os-file-loader 516 to access files from the hard drive 506. Moreover, the system 500 includes a software application 520 which includes a sorter module 522, a loader module 524, and a file analyzer 526.

The sorter module 522 receives a list of file identifiers associated with the files to be processes by the application 520 from the file-system database 514. Alternatively, the sorter module 522 can record the files processed by the software 520 and store a list of those files. Generally, the files are located on the hard drive 506, but some small files may be located in a table maintained by the file-system database 514.

The sorter module 522 optionally stores and sorts a list of file identifiers selected from the first list received or generated by the sorter module 522. Then, using the os-file-loader 516 the loader module 524 loads the files in the sorted order, as described with reference to FIGS. 3 and 4. These files are accessed from the hard drive 506 and may be stored in the main memory 508 or the cache memory 510. The file analyzer module 526 processes the files in the cache and/or main memories using the processes or 504.

Each functional component described above (e.g., the sorter module, the loader module, and the file-analyzer module) may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A computer-implemented method of loading, in computer memory, files required by a boot program, the method comprising:
   using at least one data processing device to:
   record, during at least one execution of the boot program, each file loaded in the computer memory;
   store, for each of the loaded files, a respective file identifier in a first list of file identifiers;
   store the first list on a non-volatile memory; and
   access the stored first list during subsequent execution of the boot program;

for each file identifier in the accessed first list, (i) comparing a first attribute of the file corresponding to that file identifier with a predetermined threshold to identify whether retrieval of that file requires movement of a disk-head or access to a directory structure, and (ii) when the first attribute of that file exceeds the predetermined threshold, selectively adding that file identifier to a second list designated for files that require movement of the disk-head to access;

sorting the second list based on a second attribute of the files corresponding to the file identifiers in the second list;

selecting, in sorted order, a file identifier in the sorted second list;

loading the file corresponding to the selected file identifier; and repeating the selecting and loading steps until each file identifier in the sorted second list is selected.

2. The method of claim 1, wherein the boot program comprises at least one of a virus scanner, a spyware scanner, an adware scanner, a malware scanner, a backup program, a multicopy program, a compiler, and a data-mining program.

3. The method of claim 1, wherein each of the file identifiers comprises a file entry in a directory record.

4. The method of claim 1, wherein the second attribute comprises file location.

5. The method of claim 4, wherein the location comprises a cluster location.

6. The method of claim 1, wherein the first attribute comprises file size and the threshold is one Kbyte.

7. The method of claim 1, further comprising, after loading the file, analyzing the file.

8. The method of claim 7, wherein analyzing comprises scanning the loaded file for at least one of viruses, spyware, adware, and malware.

9. The method of claim 1, wherein loading comprises storing the file in a cache memory, the method further comprising:
accessing the file from the cache memory; and
analyzing the accessed file.

10. The method of claim 1, further comprising, for each file identifier in the accessed first list, analyzing the file corresponding to that file identifier when the first attribute of that file does not exceed the predetermined threshold.

11. The method of claim 1, further comprising, for each file identifier in the accessed first list, accessing the file corresponding to that file identifier from the directory structure without use of the disk-head and analyzing the accessed file, when the first attribute of that file is less than or equal to the predetermined threshold.

12. The method of claim 1, wherein the directory structure is a Master File Table in a file system database maintained by an operating system.

13. A system for enhancing performance of a software program, the system comprising:
a processor;
a hard drive;
a memory; and
a boot program stored on the hard drive, the boot program comprising:
a sorter module configured to:
(i) use the processor to:
record, during at least one execution of the boot program, each file loaded in the memory;
store, for each of the loaded files, a respective file identifier in a first list of file identifiers;
store the first list on the hard drive; and
access the stored first list during subsequent execution of the boot program;
(ii) for each file identifier in the first list, (a) compare a first attribute of the file corresponding to that file identifier with a predetermined threshold to identify whether retrieval of that file requires movement of a disk-head or access to a directory structure, and (b) when the first attribute of that file exceeds the predetermined threshold, selectively add that file identifier to a second list designated for files that require movement of the disk-head to access; and
(iii) use the processor to sort the second list based on a second attribute of the files corresponding to the file identifiers in the second list; and
a loader module configured to use the processor to:
select, in sorted order, each file identifier in the sorted second list; and
load the files corresponding to the selected file identifiers into the memory.

14. The system of claim 13, wherein the boot program comprises at least one of a virus scanner, a spyware scanner, an adware scanner, a malware scanner, a backup program, a multicopy program, a compiler, and a data-mining program.

15. The system of claim 13, wherein each of the file identifiers comprises a file entry in a directory record.

16. The system of claim 13, wherein the second attribute comprises file location on the hard drive.

17. The system of claim 16, wherein the file location comprises a cluster location.

18. The system of claim 13, wherein the first attribute comprises file size and the threshold is one Kbyte.

19. The system of claim 13, wherein the boot program further comprises an analyzer module configured to analyze each of the loaded files using the processor.

20. The system of claim 19, wherein the analyzer module is further configured to scan each of the loaded files for at least one of viruses, spyware, adware, and malware.

21. The system of claim 13, wherein the boot program further comprises an analyzer module, and wherein:
the loader module is configured to store the files in a cache memory; and
the analyzer module is configured to access the files from the cache memory, and to analyze the accessed files.

22. The system of claim 13, wherein the boot program further comprises an analyzer module configured to analyze, for each file identifier in the first list, the file corresponding to that file identifier when the first attribute of that file does not exceed the predetermined threshold.

23. The system of claim 13, wherein the sorter module is configured to, for each file identifier in the accessed first list, access the file corresponding to that file identifier from the directory structure without use of the disk-head and cause the accessed file to be analyzed, when the first attribute of that file is less than or equal to the predetermined threshold.

24. The system of claim 13, wherein the directory structure is a Master File Table in a file system database maintained by an operating system.

* * * * *